United States Patent
Bohm

(10) Patent No.: US 10,972,775 B2
(45) Date of Patent: Apr. 6, 2021

(54) TIME SYNCHRONIZATION OF CLIENT DEVICES USING TWO-WAY TIME TRANSFER IN A LIVE CONTENT DISTRIBUTION SYSTEM

(71) Applicant: NET INSIGHT INTELLECTUAL PROPERTY AB, Stockholm (SE)

(72) Inventor: Christer Bohm, Nacka (SE)

(73) Assignee: NET INSIGHT AB, Solna (SE)

( * ) Notice: Subject to any disclaimer, the term of this patent is extended or adjusted under 35 U.S.C. 154(b) by 0 days.

(21) Appl. No.: 16/338,131

(22) PCT Filed: Sep. 29, 2017

(86) PCT No.: PCT/EP2017/074806
§ 371 (c)(1),
(2) Date: Mar. 29, 2019

(87) PCT Pub. No.: WO2018/060441
PCT Pub. Date: Apr. 5, 2018

(65) Prior Publication Data
US 2019/0273957 A1    Sep. 5, 2019

(30) Foreign Application Priority Data
Sep. 30, 2016    (SE) ...................................... 1651288

(51) Int. Cl.
*H04N 21/242*    (2011.01)
*H04J 3/06*    (2006.01)
*H04N 21/2187*    (2011.01)

(52) U.S. Cl.
CPC ......... *H04N 21/242* (2013.01); *H04J 3/0667* (2013.01); *H04J 3/0676* (2013.01); *H04N 21/2187* (2013.01)

(58) Field of Classification Search
CPC ... G06F 1/14; G06F 13/00; H03L 7/08; H03L 2207/50; H04B 7/2681; H04J 3/06;
(Continued)

(56) References Cited

U.S. PATENT DOCUMENTS

| 6,625,176 B1* | 9/2003 | Amann ................... H04L 25/14 370/503 |
| 7,191,355 B1 | 3/2007 | Ouellette et al. |

(Continued)

FOREIGN PATENT DOCUMENTS

| CN | 101155132 A | 4/2008 |
| CN | 101675614 A | 3/2010 |

(Continued)

OTHER PUBLICATIONS

Geoffrey M Garner et al: "Synchronization of audio/video bridging networks using IEEE 802.1AS", IEEE Communications Magazine, IEEE Service Center, Piscataway, US, vol. 49, No. 2, Feb. 1, 2011 (Feb. 1, 2011), pp. 140-147.

(Continued)

*Primary Examiner* — Robert B Harrell
(74) *Attorney, Agent, or Firm* — Harness, Dickey & Pierce, P.L.C.

(57) ABSTRACT

There is provided a method in a communication network system of e.g. IP type for live distribution of media content capable of node-to-node time-transfer for synchronizing a respective local clock of an originating server and at least one client device or other server by means of two-way time transfer. The media content is sent as a data stream using unicast or multicast via respective communication links over a network. The method comprises employing a mode in which two-way time transfer is selectively provided, selectively meaning that two-way time transfer is employed such that the amount of per client specific time information being (Continued)

exchanged by the server and client devices is controlled, e.g. by time limiting the two-way time transfer, or during that mode reducing the occurrence of full two-way time transfer based synchronization of the client devices.

16 Claims, 5 Drawing Sheets

(58) Field of Classification Search
CPC ...... H04J 3/0632; H04J 3/0638; H04J 3/0667; H04J 3/0676; H04J 3/0682; H04J 3/0685; H04L 29/06; H04L 29/0809; H04L 29/0854; H04L 29/08072; H04N 21/242; H04N 21/2187; H04Q 11/0478; H04W 56/0045
USPC .......................................... 370/508; 709/248
See application file for complete search history.

(56) References Cited

U.S. PATENT DOCUMENTS

| | | | | |
|---|---|---|---|---|
| 7,535,931 B1* | 5/2009 | Zampetti | .................. | H03L 7/08 370/252 |
| 9,106,645 B1* | 8/2015 | Vadlamani | ................ | G06F 1/14 |
| 2004/0223515 A1* | 11/2004 | Rygielski | ................. | G04G 7/00 370/503 |
| 2011/0051754 A1 | 3/2011 | Lansdowne | | |
| 2016/0127117 A1* | 5/2016 | Li | ............................ | G06F 1/14 375/362 |
| 2016/0165562 A1 | 6/2016 | Raghupathy et al. | | |
| 2017/0051754 A1 | 2/2017 | Gordon | | |

FOREIGN PATENT DOCUMENTS

| | | |
|---|---|---|
| CN | 101394324 B | 5/2011 |
| CN | 101202701 B | 9/2012 |
| CN | 102790913 A | 11/2012 |
| EP | 1816867 A1 | 8/2007 |
| EP | 2541815 A1 | 1/2013 |
| EP | 2993816 A1 | 3/2016 |

OTHER PUBLICATIONS

Yamada Y et al: "Hardware-based precise time synchronization on Gb/s ethernet", Global Telecommunications Conference, 2005. Globecom '05. IEEE St. Loius, MO, USA Nov. 28-Dec. 2, 2005, Piscataway, NJ, USA,IEEE, vol. 1, Nov. 28, 2005 (Nov. 28, 2005), pp. 152-156.
Joe Decuir "Two Way Time Transfer based ranging", MCCI, Oct. 6, 2004, pp. 1-20.
International Search Report PCT/ISA/210 for International Application No. PCT/EP2017/074806 dated Jan. 3, 2018.
Chinese Office Action dated Mar. 19, 2020 issued in corresponding Chinese Application No. 201780057191.7.

* cited by examiner

US 10,972,775 B2

TIME SYNCHRONIZATION OF CLIENT DEVICES USING TWO-WAY TIME TRANSFER IN A LIVE CONTENT DISTRIBUTION SYSTEM

CROSS-REFERENCE TO RELATED APPLICATIONS

This application is a national phase under 35 U.S.C. § 371 of PCT International Application No. PCT/EP2017/074806 which has an International filing date of Sep. 29, 2017, which claims priority to Swedish Application No. 1651288-1, filed Sep. 30, 2016, the entire contents of each of which are hereby incorporated by reference.

TECHNICAL FIELD

The present invention relates to the field of communication network systems for node-to-node transmission of data, and more particularly to a method for time synchronization of client devices using two-way time transfer in a network for live media content distribution.

BACKGROUND OF THE INVENTION

It is known to synchronize local clocks between a first and a second device over a network by utilizing two-way time transfer, which method comprises that the local time of the first device and the time difference between the time of the first device and a received local time from the second device are calculated. The local time and the time difference are then utilized to adjust the time of the first device. In the calculation, it is common to assume the unidirectional delay in both directions between the devices, when exchanging time information, and which together form the round-trip-time (RTT), are equal making it possible mathematically to remove any asymmetry from the two-way time transfer equation to decide the adjustment of the time of the first device.

In the application of Live TV distribution via a server to multiple client devices such as smart phones and tablets, there is a need for exact time in the respective client devices to provide a mutual synchronized video presentation between client devices and to obtain low latency. There is also another need of the exact time which is to estimate the RTT. Since the RTT can change rapidly, the estimation of RTT needs to be frequent. The RTT is mostly used for three things to i) estimate applicable time periods for timers for retransmission, ii) estimate when ABR changes shall be done to not risk losing picture because of lowering bit rate to late and iii) detect congestion in the network. Although two-way time transfer is highly reliable when used for synchronizing devices in a network, to use it to frequently estimate RTT requires massive message exchange with each client device and thus risks to affect the performance of the video distribution, since although the media content of the video is the same for all client devices, per client device unique information needs to be added to the media content to each device.

SUMMARY OF THE INVENTION

It would be advantageous to provide an improved and reliable method for time synchronization of client devices which is suitable for live distribution of media content, such as TV/video/audio streams. The present inventive concept is based on an insight that by utilizing a time-transfer method selectively, the amount of timing information transported between the server and the clients or other servers in a two-way time transfer system and an associated performance degradation caused by the central processor unit (CPU) having to process frequent messaging to calculate RTT can be considerably reduced.

The object is achieved by a method according to the present invention as defined in claim 1.

Thus, in a first aspect of the present inventive concept, there is provided a method in a network system capable of node-to-node time-transfer for synchronizing a respective local clock of an originating server and at least one client device or other server by means of two-way time transfer. The two-way time transfer comprises providing a local clock signal in the originating server, and for each of the at least one client device(s) or other server(s) which is connected to the originating server: receiving in the originating server a local clock signal of the client device or other server, estimating a time difference at the originating server based on the local clock signal of the originating server and the received clock signal from the client device or other server, transferring said local clock signal of the originating server and the estimated time difference at the server to the client device or other server, estimating a time difference at the client device or other server based on a local clock signal of the client device or other server and the received clock signal of the originating server, and adjusting the local clock signal of the client device or other server based on the received estimated time difference at the originating server, the estimated time difference at the client device or other server, and the local clock signal of the client device or other server.

The method further comprises a first mode in which two-way time transfer is selectively employed. Selectively employed two-way time transfer is defined as a two-way time transfer where the amount of per client specific time information being exchanged by the server and client devices is controlled, e.g. by time limiting the first mode, or during the first mode reducing the occurrence of full two-way time transfer based synchronization of client devices.

By selectively employing the two-way time transfer, the amount of per client specific time information exchanged by the server and the client devices is advantageously decreased which is desirable when sending time information to many devices, e.g. in Live TV distribution. The server and respective client clock signals are transferred as time stamps.

Further, by utilizing the present method, the CPU may use the same data for all client devices rather than processing payload per device.

By utilizing the selective time-transfer less timing information occupies the system and the performance hit in the distribution is decreased. This in turn allows for one server to serve a larger number of client devices or other servers. Also, as the RTT can be estimated more frequently, rapid detection of congestion allows the system to respond making quicker and more exact bandwidth BW adjustments (ABR) in the media content distribution, which increases the live TV experience and decreases the risk of affecting other traffic in the network.

According to an embodiment of the method, in the first mode two-way time transfer is employed according to at least one of: during predetermined time intervals T, and with a predetermined frequency f or rate R, which is advantageous as the amount of messaging in the network is reduced.

According to an embodiment of the method, the first mode is employed until reaching a predetermined threshold of the estimated time difference at the originating server, or the client device or the other server. That is, when the time difference between the client/other server and the originating server local clocks decreases below a predetermined threshold, the need for performing selective two-way time transfer decreases.

According to an embodiment of the method, it further comprises in the first mode estimating at least one of the predetermined time interval T, and the predetermined frequency f, and the rate R based on at least one of the estimated time difference at the originating server or the estimated time difference at the client device or other server. This is preferably done in the first mode as it allows an optimized performance of the accuracy of the clock synchronization and the amount of per device specific messaging based on the current performance level of the server-client communication. E.g. if the time difference is big the frequency of employing the two-way time-transfer in the first mode is increased or the predetermined time interval T is increased, or other measures on a system level may be adjusted, e.g. if the RTT increases the ABR level is preferably decreased.

According to an embodiment of the method, it further comprises (when exiting said first mode) employing a second mode in which only the local clock signal of the originating server and the local clock signal of the client device or other server are exchanged between the originating server and the client device or other server. This is advantageous as this provides that a majority of the timing messages, i.e. timing information sent between server and different client devices, in the second mode are identical (from server to device). Buffering of timing information is decreased, and rewriting of payload for each client device is avoided which may otherwise lower performance of the CPU in the server and thereby the number of video streams the server can send.

According to an embodiment of the method, the second mode further comprises determining unidirectional delay and/or estimating RTT between the originating server and the client device or other server based on the local clock signal of the originating server and the local clock signal of the client device or other server. In the second mode, since the local clock signals are available and accurate based on the adjustments in the first mode, unidirectional delay and RTT can be frequently estimated without performance degradation in the network. This allows for early detection of any overload or congestion in the network. A sudden step in RTT is a strong indicator of change in delay over the link.

According to an embodiment, the method comprises providing ABR adjustments based on the determined unidirectional delay or RTT. This may be done in the first mode as well as in the second mode, although the second mode is preferred because it creates a way of measuring the delay more frequently at a lower cost. This allows the system to quickly discover congestion and to react by adjusting the ABR level.

According to an embodiment of the method, the second mode is activated based on at least one of: the predetermined interval T, has passed, and a threshold value Q of the estimated time difference at the client or server has been reached. Preferably, the threshold value is a minimum value of the time difference to provide a sufficient level of synchronization between the clock of the server and the respective client. The threshold value may be selected to be fixed or dynamic depending on the specific application.

According to an embodiment of the method, the first mode is activated based on at least one of a predetermined frequency, a timer or the estimated time difference at the client or server. When the second mode is activated, an average of how the time difference in the server or the client changes over time may be monitored, and a decision to reenter the first mode may be based upon the monitored average of the time difference change over time. This is preferably done at the client device, as this distributes the processing of data in the network system from the server to its connected client devices. The performance of the server-client communication may advantageously be monitored both in the first mode and in the second mode and is used to determine when the first mode or the second mode is active, respectively.

According to an embodiment of the method, further comprising an initiating mode employing full two-way time transfer when the originating server is first connected to a new client device or another server, which is advantageous to rapidly get a very accurate clock, which is synchronized with the server clock, in the new client device.

According to a second aspect of the inventive concept, there is provided a method in a network system capable of node-to-node time-transfer between a first node, e.g. a server and at least one second node, e.g. a client device or other server, the method comprising for each one of the at least second node: transferring a local clock signal of the first node to the second node, determining a unidirectional delay between the first node and the second node based on the received local clock signal of the first node and a local clock signal of the second node, and controlling the traffic between the first and second node based on the determined unidirectional delay. In a network system the synchronization of the local clocks of the server and client devices, or clock accuracy in the network, may be provided by means of two-way time transfer or some other technique e.g. utilizing the Global Positioning System, GPS, or the Network Time Protocol, NTP, etc. for clock synchronization. By still transferring the server clock to the client device or other server, and comparing the server clock signal and local clock of the respective client device or other server, the unidirectional delay between the server and the client device can advantageously be determined. Although possible to perform from the originating server side, according to the inventive concept, this is preferably done at the client device, as this distributes the processing of data in the network system from the server to its connected client devices, respectively. Each client device or other server keeps track of the unidirectional delay experienced between itself and the server, and based on the unidirectional delay hence controls its own ABR adjustments and/or (selective) retransmission by sending appropriate requests for ABR changes or certain retransmission strategies to the server.

In addition to server-to-client communication, the present inventive concept is applicable for server-to-server communication in a system for distributing, e.g. content like video over the Internet. In an exemplifying embodiment, the communicating servers may synchronize their local clocks using another system such as NTP. The protocol traffic for such system will not necessarily pass the same path as the content streams. The local clocks will however be synchronized so the second mode of the current inventive method can be applied to measure the unidirectional delay from server to server in the direction of the content streams. As for the server to client measurements of unidirectional delay as described herein, the increase of delay indicates congestion in response to which the servers can adjust the amount of traffic between themselves. Since all servers in the case of distributing content like video, normally sends and receives all ABR levels, the specific server detecting congestion will indicate to the server from where the content streams are received to remove ABR levels, remove complete channels and potentially issue rerouting of traffic.

As mentioned above, in the case of using NTP to synchronize the time of the client or other servers, the time stamp exchanged will not pass the same path as the content data, meaning that measurements of differences in the delay in prior art systems will not indicate congestion in the path of the content stream. The second mode according to the present inventive concept however ensures that the time stamps follows the same path as the content and therefore indicates congestion precisely.

According to an embodiment of the invention, unidirectional delay is determined in the content stream direction.

According to a third aspect of the inventive concept, there is provided a node in a communication network comprising means for performing a method according to any preceding claim. It may further comprise means for transmitting the outgoing data stream, e.g. a transmitter.

In a communication system arranged for node to node communication, the node comprises a memory storing computer-readable instructions, and a processor configured to execute the computer-readable instructions to a method according to the present inventive concept. Further, according to a fourth aspect of the inventive concept, there is provided a non-transitory computer readable storage medium storing computer-readable instructions executable by a processor to cause the processor to perform the method presented herein.

Embodiments of the present inventive method are preferably implemented in a distribution, media content provider, or communication system by means of software modules for signaling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node. The node is preferably arranged at an edge node, e.g. in communication with a streaming edge server, or is integrated in/or constitutes a streaming edge server.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above will be better understood through the following illustrative and non-limiting detailed description of preferred embodiments of the present invention, with reference to the appended drawings, where the same reference numerals will be used for similar elements, and wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Figure 1:
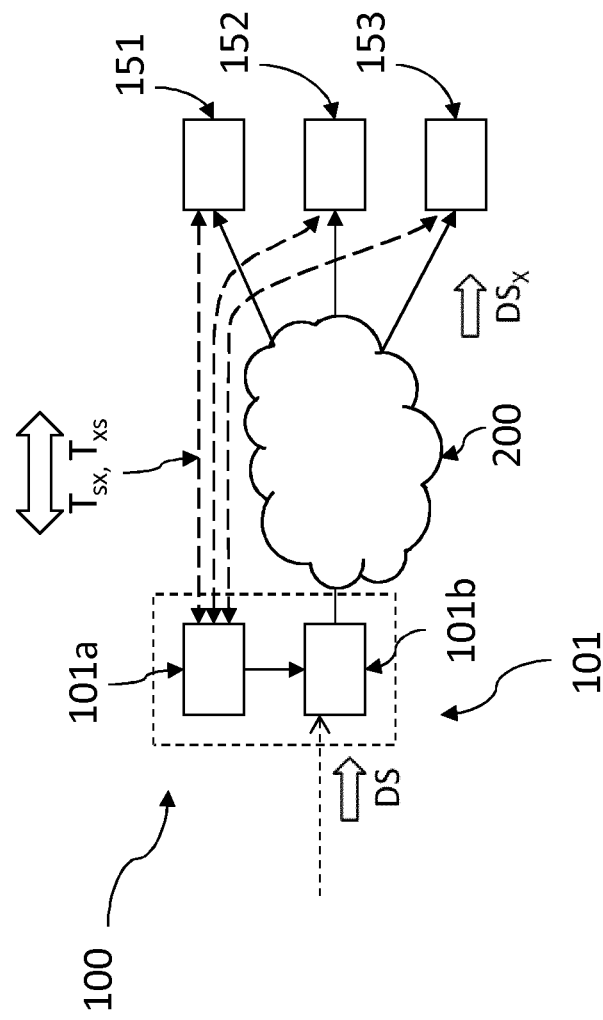
FIG. 1 and FIG. 2 are schematic block diagram illustrating a server-client communication system in which embodiments of a method and node according to the present inventive concept is employed.

Referring to FIG. 1, which is a block diagram schematically illustrating a communication network system 100 of e.g. IP type for live distribution of media content, in view of which aspects of the present inventive concept will be described. A server 101, which may be a streaming edge server, or playout server, receiving data from an ingress server (not shown) of a distribution system (not shown), is arranged for providing media content to one or more recipients or client devices 151, 152, 153. The media content is sent as a data stream DS using unicast or multicast via respective communication links over a network 200, and is typically provided as a stream of contiguous packets, which may have different size, and may represent different types of packets with some header or trailer portion identifying the type.

In the distribution network system data transmission of the data stream DS from the ingress device to the client devices 151, 152, 153 may involve transmitting e.g. video content or other media content in the form of video packets (multicast video packets), and e.g. audio packets. The data stream DS is received at the streaming edge server (playout server), here embodied by the server 101, from which the multiple client devices 151, 152, 153 located at different viewer locations request media content to display. The media content is distributed to the client devices 151, 152, 153 in separate data streams $DS_1$, $DS_2$, and $DS_3$ (illustrated as $DS_x$ in FIG. 1) over a respective communication link, which may be provided over a computer network (e.g. a LAN, a WAN, or the Internet), a wireless network (e.g. a cellular data network or WIFI), or some combination of these network types (illustrated as the secondary network 200 in FIG. 1). Each client device 151, 152, 153 comprises means for processing received media content and to select media content to play. The primary distribution network and the secondary network 200 do not need to be dedicated networks but can be shared with other services. A common timing is needed in the system to provide synchronized presentation of the media content, e.g. a video, in the each of the client devices.

According to the present inventive concept, the method (and corresponding devices) is employed in a two-way time transfer communication network system in which the devices are capable of two-way time transfer utilizing the server-to-client transmission of data packets. Each device, e.g. the server 101 and each client device 151-153, comprises a local clock, and means capable of transmitting device clock information and receiving clock information to and from the server and the respective client device. This exchange of clock information may optionally be handled via at least one network interface (NIC) or alternatively handled directly in the CPU. Between the server and the respective client device, this allows comparison of time, and round-trip time, RTT, and allows for reporting time differences between the server and the respective client device.

The client devices 151, 152, and 153 connecting to the server to request live media content may be e.g. different versions of smart phones, IP connectable TV-sets or computers from different manufacturers and thus have different performance with respect to clock speed/frequencies, tolerances etc. The client devices thus need to be synchronized to provide simultaneous playout, i.e. to provide a synchronized playout time, of the packets of the media stream $DS_x$.

Figure 2:
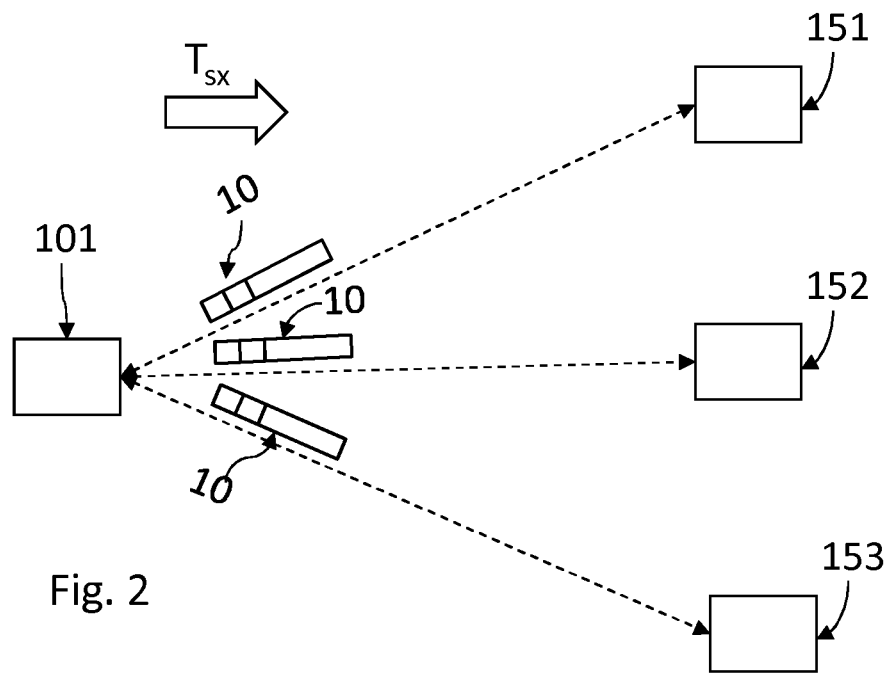
Figure 3A:
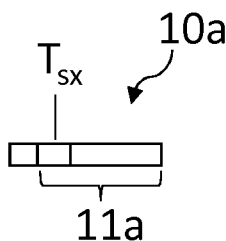
FIG. 3a and FIG. 3b are schematic illustrations of the data packet signaling between the server and connected client devices according to an embodiment of a method according to the present inventive concept.
Figure 3B:
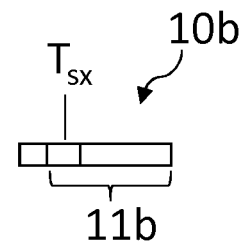

FIG. 2 is a schematic illustration of how the server 101 communicates with each client device 151, 152, 153 sending timing information $T_{sx}$ in messages, here in the form of packets 10 sent at a specific time instance. In FIGS. 3*a* and 3*b*, an example of such message data packet 10*a* containing timing information $T_{sx}$ according to an embodiment of the inventive concept is given, which is sent at a specific time instance s when the local clock of the server 101 provides a time stamp $t_s$ to each client device 151, 152, 153 (note that specific time instance is denoted s, and client device is denoted x in timing information $T_{sx}$). In FIG. 3*a*, two-way time transfer (first mode) is employed according to an embodiment of the present inventive concept. The timing information $T_{sx}$ comprises a time difference $\Delta(t_s-t_x)$ and the time stamp $t_s$, where $t_x$ is a respective per client device, in the server received, time stamp. Note that for each timing packet 10*a*, the timing information is different. The respective timing information for each client device is then given by:

client device 151, timing information $T_{s151}=[\Delta(t_s-t_{151}),t_s]$
client device 152, timing information $T_{s152}=[\Delta(t_s-t_{152}),t_s]$
client device 153, timing information $T_{s153}=[\Delta(t_s-t_{153}),t_s]$.

Each packet 10*a* contains a portion 11*a* which comprises per client timing information and payload, e.g. the same media content to be displayed by all client devices at a predefined presentation time (not shown). Note in the first mode, that portion 11*a* of the packet 10*a* is different for each client device due to the different timing information. Optionally, time differences estimated in the respective client devices are sent to the server in addition to the client device time stamps $t_x$, which is advantageous if the local clocks of the server and the client devices need to be mutually synchronized, or simply as information to the server regarding time differences associated with each client device.

In FIG. 3*b*, the second mode according to an embodiment of the present inventive concept is illustrated and here the timing information $T_{sx}$ comprises only the time stamp $t_s$. Note that for each timing packet 10*b*, the timing information is identical for all clients. The respective timing information for each client device is then given by:

client device 151, timing information $T_{s151}=[t_s]$
client device 152, timing information $T_{s152}=[t_s]$
client device 153, timing information $T_{s153}=[t_s]$.

Each packet 10*b* contains a portion 11*b* which comprises per client timing information and payload, e.g. media content to be displayed. Note that for the second mode, that portion 11*b* is identical for all client devices.

According to an embodiment of the invention the distribution system further comprises a control device for handling synchronization of playout time of media content at the client devices, which here is embodied by a separate control server 101*a*, arranged in communication with server 101*b* for data streaming and the client devices 151, 152, 153 either arranged separately from the server 101, or integrated in the server 101 as illustrated with the dashed box (server 101) in FIG. 1. When integrated in the server 101, the control device 101*a* is preferably a software module and/or data-transport module comprising a processor, and memory device, or when implemented in an external device comprising a processor and memory device.

Figure 4:
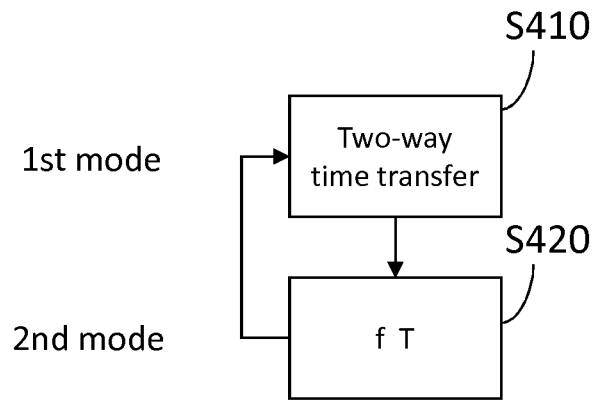
FIG. 4-FIG. 7 are schematic flow charts illustrating embodiments of a method according to the present inventive concept.

According to an embodiment of a method according to the present inventive concept, with reference to FIG. 1 and FIG. 4, in a first step S410, a first mode with selective two-way time transfer according to the invention is (individually) employed for a connected client device, which is subsequently followed by step S420, in which a second mode is activated.

In a scenario when the local clock of the server 101 is considered trustworthy, the playout of the live media content DS to all client devices connected to that server are synchronized with respect to the local clock of the server 101 by means of providing the local clock signal and transferring a time stamp of the same to the (each) client device which is connected to the server, receiving in the server a local clock signal of the client device, estimating in the server a time difference based on the local clock signal of the server and the received clock signal from the client device, transferring the estimated time difference between the server and the client device to the client device, and adjusting the local clock signal of the client device based on the estimated time difference. This procedure may be repeated until the time difference between the client device and the server reaches an acceptable threshold value, which represents a quality factor Q of the synchronization of the respective client device clock with respect to the server, or within a predetermined time period T before continuing to step S420.

As step S420 is activated, the use of two-way time transfer may be made selective by the employing, i.e. returning to step S410, the two-way time transfer (first mode) with a predetermined frequency f or rate. Examples of typical applicable frequency is 10 times per second. According to an embodiment, the first mode is employed during a predetermined time interval T, which typically can be 100 ms each second.

Figure 5:
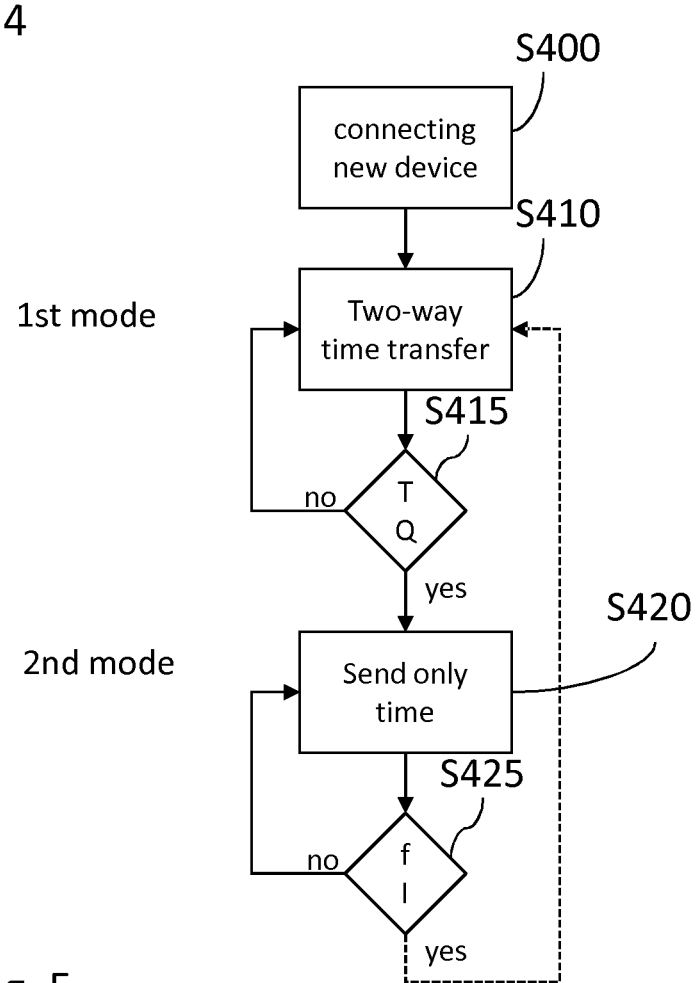
Figure 7:
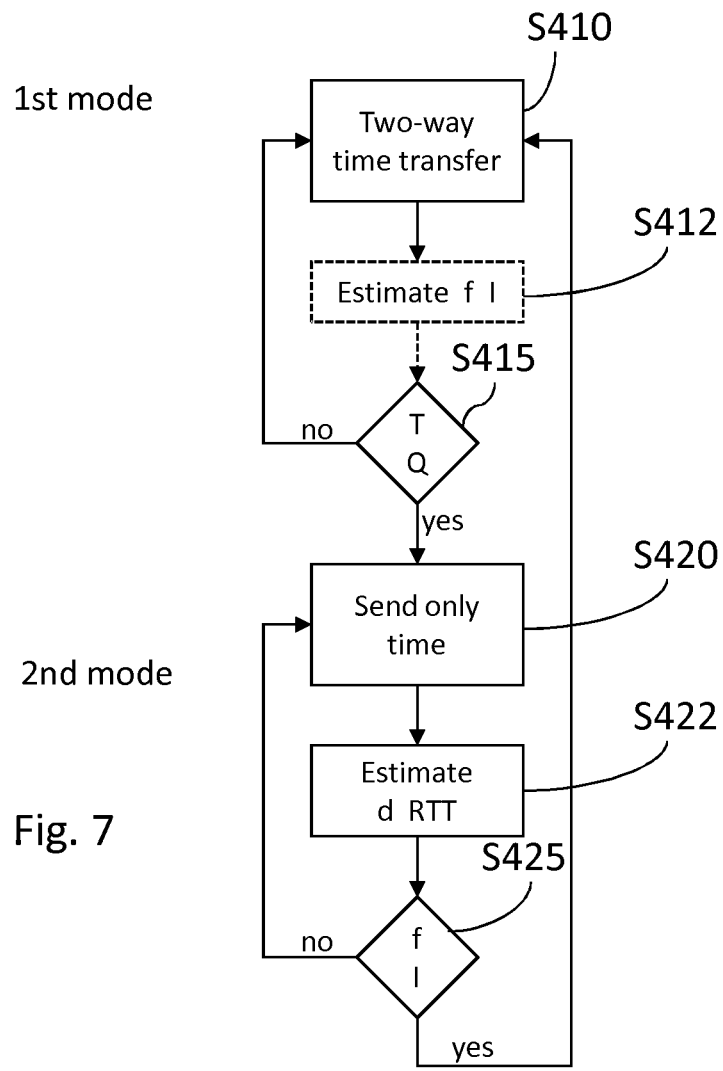

According to an embodiment of the method, as illustrated in FIG. 5, when connecting a new device to the server in an initial step S400, full two-way time transfer is employed to adjust the device clock. At startup of the distribution system, this will be relevant for all devices and to preserve BW/processing the lowest ABR level may be employed. In normal operation, only newly connected devices will initially use full two-way time transfer. When the client device clock has been reasonable adjusted, the two-way time transfer is selectively used (or sent) entering the first mode, step S410, with low frequency f to reduce the number of per client device specific messages and to maintain the client device clock adjusted, or entering and exiting the selective two-way time transfer (first mode) based on other factors as illustrated with reference to FIG. 5. In the shown method, in between employing the two-way time transfer selectively (first mode), when in a step S415, either a time period T or optionally based on the measured quality factor Q, which may be directly derived from the estimated time difference between the client device- and the server clocks, the method enters a step S420 in which the server only sends time stamps of its own clock (not the time difference between its clock and the respective client device clock), meaning that all client devices receive the same message. This message, comprising a time stamp of the local clock of the server, can then be used to determine in a step S422 (see FIG. 7) unidirectional delay from server to device and the RTT by simply multiplying the unidirectional delay from server to device with 2 when symmetric delay is assumed. The method may comprise an optional step of providing ABR adjustments, or other method, e.g. selective retransmission, to reduce the traffic to avoid congestion, based on the determined unidirectional delay (or RTT). If in the second mode, it is determined that the unidirectional delay (or RTT) increases above or below a predetermined range or if increase/decrease of the unidirectional delay (or RTT) is very rapid, the ABR of is adjusted accordingly. The estimation of the server to device delay will be accurate since both the server- and device clocks are sufficiently synchronized and the difference between the received clock and the local clock estimates the unidirectional delay.

In a step S425, based on the preset frequency f for employing the first mode or alternatively a predetermined time interval I or a measured or estimated performance factor like RTT, step S410 is subsequently employed.

Figure 6:
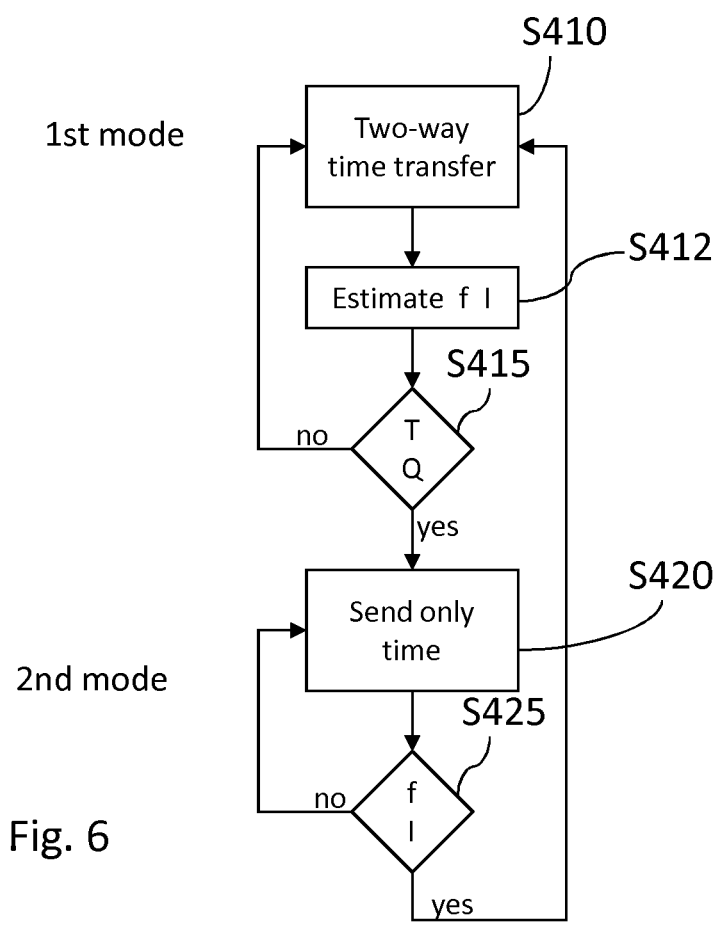

In FIG. 6, the shown embodiment of the method comprises a step S412 which may be positioned between step S410 and step S415. The method then further comprises estimating at least one of the predetermined time interval I, and the predetermined frequency f based on the estimated time difference which is available in the first mode when two-way time transfer is selectively provided.

In order to handle missing packets and other types of errors, communication and distribution systems employ various techniques to handle erroneously received information. The client devices may correct the erroneously received information amongst other techniques by retransmission techniques, which enable the erroneously received information to be retransmitted to the receiver, for example, by using automatic retransmission request (ARQ).

According to an embodiment of the method, the RTT is estimated based on the unidirectional delay in the system to determine timer settings for retransmission of NACKs to recover from lost NACKs or retransmitted data, typically timers are set to 4×RTT to balance out unnecessary retransmissions of NACK and data in relation to delays in the system. By performing the RTT estimations in the second mode (S422), the estimation of the RTT can be done frequently and thus be more accurate.

According to the present inventive concept, timing information is utilized for providing exact time for presentation of video in the client devices, unidirectional delay and RTT estimations, detection of changes in unidirectional delay between server and client devices or other servers to be able to detect overload in the network, and to detect performance of the system where no overload is present (low and constant delay). If overload is detected this is attended to by lowering the ABR level of the distributed media content or by avoiding retransmitting data. Controlling of the traffic may further comprise rerouting of traffic between a first node, e.g. the originating server, and a second node, e.g. a receiving server or a client device based on the determined unidirectional delay.

When the originating server is arranged for distributing a plurality of data channels, where each channel is distributed as a plurality of streams, each representing a specific ABR level, to a number of receiving servers, the controlling of the traffic may be performed by rerouting the streams in the network or selectively reducing the number of distributed channels and/or the number of distributed ABR-levels. In an example five ABR levels, e.g. 0.5, 1.0, 1.5, 2.5 and 3.5 Mbps which in total represents 9 Mbps of traffic, are distributed from server to server. If the unidirectional delay increases and indicates that there is a problem with congestion, the number of ABR levels is reduced, and only selected ABR levels, e.g. 0.5 and 2.5 Mbps are distributed, which reduces the total traffic for the channel from 9 to 3 Mbps and thereby further congestion is potentially avoided.

The invention claimed is:

1. A method in a network system capable of node-to-node time-transfer for synchronizing a respective local clock of an originating server and at least one client device or other server by means of two-way time transfer, wherein two-way time transfer comprises providing a local clock signal of the originating server, and for each client device or other server of said at least one client device or other server which is connected to the originating server:
receiving, in the originating server, a local clock signal of the client device or other server;
estimating a time difference at the originating server based on the local clock signal of the originating server and the received local clock signal of the client device or other server;
transferring said local clock signal of the originating server and the estimated time difference at the originating server to the client device or other server;
estimating a time difference at the client device or other server based on the local clock signal of the client device or other server and the local clock signal of the originating server; and
adjusting the local clock signal of the client device or other server based on the estimated time difference at the originating server, the estimated time difference at the client device or other server, and the local clock signal of the client device or other server,
said method comprising a first mode in which two-way time transfer is employed, and further comprising a second mode in which only said local clock signal of the originating server and said local clock signal of the client device or other server are exchanged between said originating server and said client device or other server.

2. The method according to claim 1, further comprising determining unidirectional delay and/or round-trip-time, RTT, between said originating server and said client device or other server based on said local clock signal of the originating server and said local clock signal of the client device or other server.

3. The method according to claim 2, further comprising providing ABR adjustments based on said determined unidirectional delay or RTT.

4. The method according to claim 2, wherein said determined unidirectional delay is determined in a content stream direction.

5. The method according to claim 1, wherein, in the first mode, two-way time transfer is employed according to at least one of:
during predetermined time intervals T, and
with a predetermined frequency f or rate R.

6. The method according to claim 5, further comprising in said first mode estimating at least one of said predetermined time interval T, said predetermined frequency f, and rate R based on at least one of said estimated time difference at the originating server, and said estimated time difference at the client device or other server.

7. The method according to claim 1, wherein said first mode is employed until reaching a predetermined threshold of
said estimated time difference at the originating server, or
said estimated time difference at the client device or the other server.

8. The method according to claim 1, wherein said second mode is activated based on at least one of: a predetermined interval T has passed, and a threshold value of either said estimated time difference at the client device or other server or said estimated time difference at the originating server has been reached in the first mode.

9. The method according to claim 1, wherein said first mode is activated based on at least one of a predetermined frequency, a timer, or the estimated time difference at the client device or other server.

10. The method according to claim 1, further comprising an initiating mode employing full two-way time transfer when said originating server is first connected to a new client device or other server.

11. A method in a network system capable of node-to-node time-transfer between a first node and at least one second node, said method comprising, for each second node of said at least one second node:
    transferring a local clock signal of the first node to said second node;
    determining a unidirectional delay between said first node and said second node based on the transferred local clock signal of the first node and a local clock signal of the second node; and
    controlling traffic between the first node and the second node based on said determined unidirectional delay,
    wherein the controlling the traffic includes at least one of providing ABR adjustments, rerouting of traffic between the first node and the second node, and/or employing selective retransmission based on said determined unidirectional delay.

12. The method according to claim 11, wherein said unidirectional delay is determined in a content stream direction.

13. A method in a network system capable of node-to-node time-transfer between a first node and at least one second node, said method comprising, for each second node of said at least one second node:
    transferring a local clock signal of the first node to said second node;
    determining a unidirectional delay between said first node and said second node based on the transferred local clock signal of the first node and a local clock signal of the second node; and
    controlling traffic between the first node and the second node based on said determined unidirectional delay,
    wherein said first node is arranged for distributing a plurality of data channels, each comprising a predefined number of ABR levels, to said at least one second node, wherein said controlling of the traffic comprises ABR adjustments performed by selectively reducing a number of distributed channels and/or a number of distributed ABR-levels.

14. The method according to claim 13, wherein said unidirectional delay is determined in a content stream direction.

15. A node in a communication system arranged for node to node communication, the node comprising:
    a memory storing computer-readable instructions, and
    a processor configured to execute the computer-readable instructions to perform a method for synchronizing a respective local clock of an originating server and at least one client device or other server by means of two-way time transfer, wherein two-way time transfer comprises providing a local clock signal of the originating server, and
        for each client device or other server of said at least one client device or other server which is connected to the originating server:
        receiving, in the originating server, a local clock signal of the client device or other server;
        estimating a time difference at the originating server based on the local clock signal of the originating server and the received local clock signal of the client device or other server;
        transferring said local clock signal of the originating server and the estimated time difference at the originating server to the client device or other server;
        estimating a time difference at the client device or other server based on the local clock signal of the client device or other server and the local clock signal of the originating server; and
        adjusting the local clock signal of the client device or other server based on the estimated time difference at the originating server, the estimated time difference at the client device or other server, and the local clock signal of the client device or other server,
    said method comprising a first mode in which two-way time transfer is employed, and further comprising a second mode in which only said local clock signal of the originating server and said local clock signal of the client device or other server are exchanged between said originating server and said client device or other server.

16. A non-transitory computer readable storage medium storing computer-readable instructions executable by a processor to cause the processor to perform:
    a method in a network system capable of node-to-node time-transfer for synchronizing a respective local clock of an originating server and at least one client device or other server by means of two-way time transfer, wherein two-way time transfer comprises providing a local clock signal of the originating server, and
    for each client device or other server of said at least one client device or other server which is connected to the originating server:
        receiving, in the originating server, a local clock signal of the client device or other server;
        estimating a time difference at the originating server based on the local clock signal of the originating server and the received local clock signal of the client device or other server;
        transferring said local clock signal of the originating server and the estimated time difference at the originating server to the client device or other server;
        estimating a time difference at the client device or other server based on the local clock signal of the client device or other server and the local clock signal of the originating server; and
        adjusting the local clock signal of the client device or other server based on the estimated time difference at the originating server, the estimated time difference at the client device or other server, and the local clock signal of the client device or other server,
    said method comprising a first mode in which two-way time transfer is employed, and further comprising a second mode in which only said local clock signal of the originating server and said local clock signal of the client device or other server are exchanged between said originating server and said client device or other server.

* * * * *

UNITED STATES PATENT AND TRADEMARK OFFICE
CERTIFICATE OF CORRECTION

| | | |
|---|---|---|
| PATENT NO. | : 10,972,775 B2 | Page 1 of 1 |
| APPLICATION NO. | : 16/338131 | |
| DATED | : April 6, 2021 | |
| INVENTOR(S) | : Christer Bohm | |

It is certified that error appears in the above-identified patent and that said Letters Patent is hereby corrected as shown below:

On the Title Page

Item (71), should read:
(71) Applicant: NET INSIGHT AB, Solna (SE)

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*